United States Patent
Yanik et al.

(10) Patent No.: US 10,852,225 B2
(45) Date of Patent: Dec. 1, 2020

(54) CORROSION INDICATOR FOR USE WITH A PIPING SYSTEM, AND A PIPING SYSTEM USING THE CORROSION INDICATOR

(71) Applicant: Crane Resistoflex, Marion, NC (US)

(72) Inventors: David Yanik, Asheville, NC (US); Bradley Allen, Marion, NC (US)

(73) Assignee: Crane Resistoflex, Marion, NC (US)

( * ) Notice: Subject to any disclaimer, the term of this patent is extended or adjusted under 35 U.S.C. 154(b) by 192 days.

(21) Appl. No.: 16/106,264

(22) Filed: Aug. 21, 2018

(65) Prior Publication Data

US 2019/0072479 A1 Mar. 7, 2019

Related U.S. Application Data

(60) Provisional application No. 62/553,491, filed on Sep. 1, 2017.

(51) Int. Cl.
| | |
|---|---|
| *G01N 17/04* | (2006.01) |
| *G01M 3/18* | (2006.01) |
| *F16L 58/10* | (2006.01) |

(52) U.S. Cl.
CPC ............ *G01N 17/04* (2013.01); *G01M 3/182* (2013.01); *F16L 58/1009* (2013.01)

(58) Field of Classification Search
CPC ..... F16L 58/1009; G01M 3/182; G01N 17/04
See application file for complete search history.

(56) References Cited

U.S. PATENT DOCUMENTS

| | | | | |
|---|---|---|---|---|
| 1,972,728 A | * | 9/1934 | Andrus | B01J 19/02 220/565 |
| 1,975,832 A | * | 10/1934 | De Florez Luis | F17D 5/02 138/36 |
| 1,977,177 A | * | 10/1934 | De Flores Luis | B01J 19/02 138/36 |
| 3,299,387 A | * | 1/1967 | Sanford | G01N 27/121 338/35 |
| 3,316,752 A | * | 5/1967 | Webb | G01M 3/185 73/40.5 R |
| 3,532,797 A | * | 10/1970 | Lunig | F27D 21/0021 373/75 |
| 3,910,830 A | * | 10/1975 | Mayse | G01N 17/02 204/404 |
| 3,996,124 A | * | 12/1976 | Eaton | G01N 17/02 204/404 |
| 4,098,662 A | * | 7/1978 | Schell | G01N 17/00 165/11.1 |
| 4,112,417 A | * | 9/1978 | Himeno | G01M 3/045 340/605 |
| 4,206,632 A | * | 6/1980 | Suzuki | G01M 3/165 174/11 R |
| 4,248,809 A | * | 2/1981 | Sakai | C21B 7/06 264/30 |
| 4,404,516 A | * | 9/1983 | Johnson, Jr. | G01M 3/045 324/525 |
| 4,442,422 A | * | 4/1984 | Murata | G01N 27/121 338/35 |
| 4,497,701 A | * | 2/1985 | Murata | G01N 27/121 204/430 |

(Continued)

*Primary Examiner* — John Fitzgerald

(57) ABSTRACT

Methods and devices for detecting and indicating corrosion and rate of progression of corrosion in piping such as piping having non-metallic liners.

19 Claims, 1 Drawing Sheet

(56) References Cited

U.S. PATENT DOCUMENTS

| | | | | |
|---|---|---|---|---|
| 4,570,477 | A * | 2/1986 | Sugibuchi | G01M 3/165 |
| | | | | 174/11 R |
| 4,655,077 | A * | 4/1987 | Purvis | B04C 11/00 |
| | | | | 73/86 |
| 4,752,360 | A * | 6/1988 | Jasinski | G01N 17/02 |
| | | | | 205/776.5 |
| 4,863,572 | A * | 9/1989 | Jasinski | G01N 17/02 |
| | | | | 205/775.5 |
| 4,922,748 | A * | 5/1990 | Hopenfeld | G01M 3/22 |
| | | | | 250/303 |
| 4,942,364 | A * | 7/1990 | Nishijima | G01N 27/121 |
| | | | | 324/696 |
| 5,382,908 | A * | 1/1995 | Forsstrom | G01N 27/07 |
| | | | | 174/11 R |
| 5,613,549 | A * | 3/1997 | Dolwani | F01P 11/16 |
| | | | | 165/11.1 |
| 5,918,267 | A * | 6/1999 | Evans | G01M 3/165 |
| | | | | 174/11 R |
| 5,992,217 | A * | 11/1999 | Jax | F17D 5/06 |
| | | | | 73/40 |
| 6,342,295 | B1 * | 1/2002 | Kobayashi | G01N 27/121 |
| | | | | 338/35 |
| 6,634,388 | B1 * | 10/2003 | Taylor | B29C 63/34 |
| | | | | 138/104 |
| 6,899,141 | B2 * | 5/2005 | Connor | B29C 63/343 |
| | | | | 138/146 |
| 7,080,667 | B2 * | 7/2006 | McIntyre | F16L 55/07 |
| | | | | 138/104 |
| 8,474,474 | B2 * | 7/2013 | Wilke | F16K 37/0083 |
| | | | | 116/208 |
| 9,372,209 | B2 * | 6/2016 | Iwamoto | G01R 19/00 |
| 9,448,209 | B2 * | 9/2016 | Klopffer | G01M 3/243 |
| 9,581,559 | B2 * | 2/2017 | Neikirk | G01N 27/021 |
| 9,726,594 | B2 * | 8/2017 | Jovancicevic | G01N 17/02 |
| 10,240,706 | B2 * | 3/2019 | Andronaco | F16L 9/18 |
| 2004/0144441 | A1 * | 7/2004 | Connor | B29C 48/09 |
| | | | | 138/141 |
| 2005/0183785 | A1 * | 8/2005 | Lundberg | F16L 11/082 |
| | | | | 138/130 |
| 2005/0189763 | A1 * | 9/2005 | Fasel | F16L 9/08 |
| | | | | 285/230 |
| 2005/0223780 | A1 * | 10/2005 | Brewer | F17D 5/02 |
| | | | | 73/40.5 R |
| 2006/0125480 | A1 * | 6/2006 | Srinivasan | G01N 17/02 |
| | | | | 324/376 |
| 2007/0193357 | A1 * | 8/2007 | Daaland | G01B 17/02 |
| | | | | 73/626 |
| 2012/0176147 | A1 * | 7/2012 | Hefner | G01N 17/04 |
| | | | | 324/700 |
| 2013/0125655 | A1 * | 5/2013 | Klopffer | F16L 58/1009 |
| | | | | 73/592 |
| 2013/0278275 | A1 * | 10/2013 | Iwamoto | G01N 17/04 |
| | | | | 324/637 |
| 2015/0048844 | A1 * | 2/2015 | Neikirk | G01N 27/021 |
| | | | | 324/655 |
| 2015/0268153 | A1 * | 9/2015 | Johannes Jacobus Maria | |
| | | | | G01N 17/04 |
| | | | | 205/775.5 |
| 2017/0322143 | A1 * | 11/2017 | Anand | G01N 17/006 |
| 2017/0350230 | A1 * | 12/2017 | Dronen | E21B 41/02 |
| 2018/0051841 | A1 * | 2/2018 | Andronaco | F16L 55/07 |

\* cited by examiner

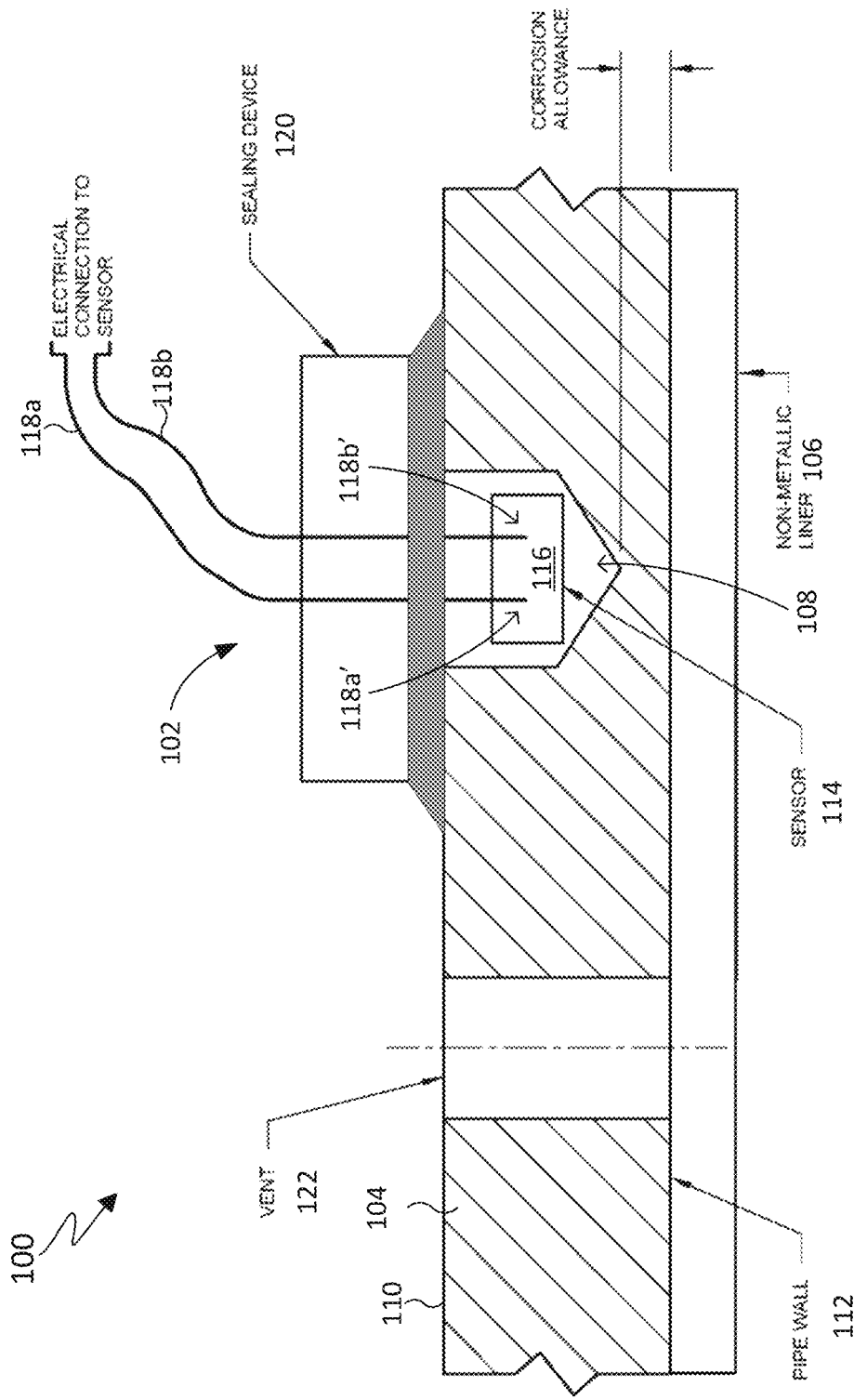

CORROSION INDICATOR FOR USE WITH A PIPING SYSTEM, AND A PIPING SYSTEM USING THE CORROSION INDICATOR

CROSS-REFERENCE TO RELATED APPLICATION

This application claims the benefit of Provisional Application No. 62/553,491, filed Sep. 1, 2017, which is incorporated herein by reference in its entirety.

FIELD OF THE INVENTION

The present disclosure relates generally to detecting and indicating corrosion in piping, and relates more particularly to methods and devices for detecting and indicating corrosion in piping such as piping having non-metallic liners.

BACKGROUND OF THE INVENTION

Within certain industries it is common to use pipes lined with a non-metallic material, such as a polymeric material, for conveying certain materials or media, particularly those that are highly corrosive or that might themselves be compromised by contact with the material of the pipe itself.

The fluid or medium flowing through such a piping system may over time permeate the liner, and begin to be present at the interface of the liner and the material of which the outer pipe itself is made (typically metal). Due to the corrosiveness of the medium, there is often a danger of chemical damage to the pipe, which may ultimately lead to compromise of the mechanical integrity of the pipe. The fluid being conveyed through the pipe may in some cases be filtered or fractionated by the permeation process and can itself react with the material of the outer pipe; hence, what is permeating the liner, and what ultimately accumulates in the micro-space between the liner and the outer pipe, may include additional chemical species besides the medium being conveyed. Moreover, other chemical species may also be present outside the liner. These can react with the permeate chemical species creating a more aggressive chemical compound. A common example is the permeation of anhydrous hydrogen chloride, which is not by itself corrosive to carbon steel. However, moisture from humidity or rainwater in the micro-space between the liner and the pipe will react with hydrogen chloride to create aqueous hydrochloric acid, which is highly corrosive to carbon steel.

To avert these potential problems, it is common to provide vents in the pipe, to permit the fluid to escape. This prevents the build-up of high pressure, and may help reduce exposure of the outer pipe to corrosive action of the material permeating the liner. However, vents in a particular pipe system may become clogged by the material they are supposed to vent, or by a corrosive by-product of that material.

The material permeating the liner and accumulating between liner and pipe may manage to corrode the interior of the pipe. Whereas in a pipe system in which pipes are not lined, it may be possible to detect the thinning of a pipe by ultrasound testing or other means, the presence of the liner renders such known techniques unavailable or unreliable.

There is an on-going need for corrosion indicators for lined pipes.

SUMMARY OF THE INVENTION

In an aspect, the invention features a pipe corrosion indicating system, comprising a metal pipe having an inner surface and an outer surface and having a thickness extending between the inner and the outer surfaces; a non-metallic liner in the pipe, contacting the inner surface of the pipe; and a corrosion indicator. The corrosion indicator comprises a cavity formed in the outer surface of the pipe; and a sensor in the cavity.

In some embodiments, the non-metallic liner comprises a polymeric material. In some embodiments, the polymeric material is an elastomer.

In some embodiments, the sensor is capable of detecting water, an acid, a base and/or a halogen.

In some embodiments, the system further comprises first and second electrical conductors each having a first end in the cavity and an exterior second end for connection to a voltage source connected to the sensor.

In some embodiments, the sensor further comprises a member comprising an electrically insulative material disposed in the cavity, the first ends of the electrical conductors extending into the insulative material and being spaced from each other in the insulative material. In some embodiments, the insulative material is capable of absorbing fluid. In some embodiments, the insulative material is porous. In some embodiments, the insulative material is a mineral, ceramic, clay and/or polymeric material. In some embodiments, the electrical conductors become electrically connected when the insulative material absorbs a predetermined amount of the fluid.

In some embodiments, the system further comprises a sealing device, which seals an inside of the cavity containing the sensor from ambient atmosphere. In some embodiments, the sealing device comprises a metallic lid and a non-metallic grommet.

In some embodiments of the system, the cavity extends from the outer surface of the pipe a fraction X of the thickness of the pipe, whereby the cavity has a deepest portion located a distance from the inner surface equal to (1−X) times the thickness of the pipe, and wherein corrosion of a portion of the thickness of the pipe equal to (1−X) of the thickness, beginning from the inner surface, allows permeate chemical species into the cavity and into contact with the sensor. In some embodiments, the value of X is from about 0.95 to about 0.05.

In some embodiments, the system comprises a plurality of corrosion indicators located around a single vent, and each being in a cavity of a different respective depth, whereby corrosion of a portion of the thickness of the pipe beginning from the inner surface allows permeate chemical species into the respective cavities of plural ones of the corrosion indicators in succession as the corrosion progresses.

In some embodiments, the pipe has a vent that extends through the thickness of the pipe, and wherein the corrosion detector is located within a distance of about six inches from the vent in a longitudinal direction of the pipe.

In some embodiments, the system further comprises a voltage source connected to the exterior second ends of the electrical conductors continuously. In some embodiments, the system further comprises a voltage source configured to be connected to the exterior second ends of the electrical conductors at intervals of time.

In an aspect, the invention features a pipe corrosion indicating system, comprising: a metal pipe having an inner surface and an outer surface and having a thickness extending between the inner and the outer surfaces; a non-metallic liner in the pipe, contacting the inner surface of the pipe; and a corrosion indicator. The corrosion indicator comprises: a cavity formed in the outer surface of the pipe; first and second electrical conductors each having a first end in the cavity and an exterior second end for connection to a voltage source; and a porous member comprising an electrically insulative material disposed in the cavity, the first ends of the electrical conductors extending into the porous member and being spaced from each other in the porous member.

In an aspect, the invention features a corrosion indicator suitable for use in a metal pipe, the pipe having an inner surface and an outer surface and having a thickness extending between the inner and the outer surfaces, and having a non-metallic liner in the pipe, contacting the inner surface, the corrosion indicator comprising: first and second electrical conductors each having a first end and each having an exterior second end for connection to a voltage source; and a member comprising an electrically-insulating material disposed in a cavity in the thickness of the pipe, the first ends of the electrical conductors extending into the insulative material and being spaced from each other in the insulative material.

BRIEF DESCRIPTION OF THE DRAWING

FIG. 1 is a schematic view of the corrosion indicator in a pipe.

DETAILED DESCRIPTION

The present disclosure provides a corrosion indicator 102 that may be provided on a lined pipe 104 to indicate when corrosion has occurred. The indicator 102 thus serves to detect when corrosion has occurred (or when a predetermined amount has occurred), and provide an indication to that effect, to alert users to the condition.

In an embodiment, the pipe 104 is made of metal. In an embodiment, the metal is iron, steel, copper or an alloy.

In an embodiment, the liner 106 is made of a non-metallic material. In an embodiment, the non-metallic material comprises a polymeric material in an embodiment, the polymeric material is an elastomer. In an embodiment, the polymeric material is polytetrafluoroethylene (PTFE), polvinylidene fluoride (PVDF), polypropylene (PP), ethylene-tetrafluoro-ethylene (ETFE) and/or perfluoroalkoxy-alkane (PFA).

As shown in the example embodiment illustrated in FIG. 1, a cavity 108 such as a bore-hole may be formed in the outer surface 110 of the pipe 104. In an embodiment, the diameter of the bore-hole is at least about equal to the thickness of the pipe 104, at least about twice the thickness of the pipe 104, at least about three times the thickness of the pipe 104, at least about four times the thickness of the pipe 104, or any diameter there between. The cavity 108 is formed so that its deepest portion (i.e., a portion that is farthest from the outer surface 110 of the pipe 104, and closest to the inner surface 112), is at a predetermined spacing from the inner surface 112. This spacing is marked "corrosion allowance" in the drawing, and indicates how much of the thickness of the pipe 104 may be corroded before the corrosion indicator 102 detects the corrosion and generates an alarm. In an embodiment, the corrosion allowance is at least about 0.5% of the thickness of the pipe 104, at least about 5% of the thickness of the pipe 104, at least about 10% of the thickness of the pipe 104, at least about 25% of the thickness of the pipe 104, at least about 50% of the thickness of the pipe 104, at least about 75% of the thickness of the pipe 104, at least about 90% of the thickness of the pipe 104, at least about 95% of the thickness of the pipe 104, at least about 99% of the thickness of the pipe 104, at least about 99.5% of the thickness of the pipe 104, or any thickness there between. In an embodiment, the corrosion allowance is from about 0.5% to about 99.5% of the thickness of the pipe 104. In another embodiment, the corrosion allowance is from about 5% to about 50% of the thickness of the pipe 104. A user can select the corrosion allowance depending upon how much corrosion of the pipe 104 is tolerable before an alert is generated. For example, if the pipe 104 conveys a hazardous material (such as phosgene, hydrofluoric acid, chloroacetic acid, or oleum), it may be desirable for the corrosion allowance to be small such that corrosion is detected at an early stage. Conversely, if the pipe 104 carries a non-toxic material (such as sea water) the corrosion allowance may be larger.

Inside the cavity 108 is a sensor 114. In an embodiment, the sensor 114 may be a commercially available sensor that is capable of detecting a material conveyed by the pipe 104, or other chemical species derived therefrom. Suitable sensors include water sensors, acid sensors, base sensors and/or halogen sensors. In another embodiment, the sensor 114 comprises a member 116 comprising an electrically insulative material. In an embodiment, the insulative material is capable of absorbing fluid. The fluid may be a liquid, a gas, or a mixture of liquid and gas. In an embodiment, the insulative material is capable of absorbing water or an aqueous solution. In an embodiment, the insulative material is capable of becoming conductive upon absorbing a fluid, such as water or an aqueous solution. In an embodiment, the insulative material is porous. In an embodiment, the insulative material comprises a mineral, ceramic, clay and/or polymeric material. Suitable insulative materials include porous ceramics based on oxides, carbides and/or nitrides, such as alumina, zirconia and/or silicon carbide.

In an embodiment, a wire pair 118a and 118b is provided, and each of the wires has an end extending into the insulative material. These two wire ends 118a' and 118b' are located a certain distance apart, based on, e.g., the porosity of the insulative material, the rate at which that material absorbs material of the type that will accumulate between the liner 106 and the outer pipe 104 in the particular pipe system 100, the resistivity of the insulative material, and the amount of fluid that must be present in the material in question to make the material sufficiently electrically conductive to be detectable. In an embodiment, the distance between the wire ends 118a' and 118b' is at least about 0.01 inches, at least about 0.02 inches, at least about 0.05 inches, at least about 0.1 inches, at least about 0.12 inches, at least about 0.15 inches, or any distance there between. In an embodiment, the distance between the wire ends 118a' and 118b' is from about 0.02 inches to about 0.12 inches.

The conductive liquid is typically an aqueous solution of one or more ionic compounds, such as metal salts, inorganic acids, carboxylic acids, inorganic bases and/or halogens.

In an embodiment, the cavity 108 is sealed with a sealing device 120. In an embodiment, the sealing device 120 forms an hermetic seal. In an embodiment, the sealing device 120 comprises a lid and a grommet. In an embodiment, the lid is metallic and the grommet is non-metallic. In an embodiment, the sealing device 120 is held in a small metallic vessel welded in place on the outer surface 110 of the pipe 104. The two wires 118a and 118b extend through the grommet, and their exterior ends are (in use) connected to a voltage source. Because the dry material is insulative, the circuit is incomplete, but when corrosion has thinned the interior of the pipe 104 sufficiently to admit fluid into the cavity 108, and enough of that fluid has been absorbed to render the insulative material conductive, the circuit is completed, allowing current to flow through the wire pair 118a and 118b. In an embodiment, the completion of the circuit is used as a signal to a suitable processor that further processes the information. The circuit also preferably includes any suitable device for providing an alert to the user. Such an alert might be a visual warning, such as a light being illuminated or a message being displayed on a screen, or if desired, an audible warning; it might alternatively, or in addition, be the transmission of a pre-stored message to a preset destination in the enterprise responsible for operating or for maintaining the pipe system 100. Many other types of alert may be incorporated, as desired.

In some embodiments, an alarm or other indication of the corrosion condition may be generated at the location of the corrosion indicator 102 itself, at the pipe 104, or at a remote location such as an operation room for the pipe system 100. For instance, a message may be transmitted electronically to a remote display or processing device.

In some embodiments, the wire pair 118a and 118b may be connected to a voltage source continually, so that an alert will be generated as soon as the insulative material absorbs enough fluid to become conductive, or in other embodiments, the connection to the voltage source may be configured to be effected only from time to time (either manually, or automatically, or by a timing circuit).

Because corrosion processes tend to progress most rapidly in proximity to the vent 122 opening, as the permeate species can become more aggressive when exposed to atmospheric moisture, in some embodiments the corrosion indicator 102 may advantageously be provided near one of the vents. In an embodiment, the corrosion indicator 102 is at least about 0.175 inches from a vent 122, at least about 0.5 inches from a vent 122, at least about 1 inch from a vent 122, at least about 3 inches from a vent 122, at least about 6 inches from a vent 122, at least about 8 inches from a vent 122, or any distance there between. In an embodiment, the corrosion indicator 102 is from about 0.5 inches to about 6 inches from a vent 122.

In some embodiments, plural corrosion indicators 102 may be provided near each other, or at the same location (e.g., about the same distance across the pipe surface from a single vent 122). In an embodiment, the corrosion indicators 102 are positioned in an approximately circular arrangement around a vent 122. In an embodiment, the diameter of the circular arrangement is at least about the pipe wall thickness, at least about twice the pipe wall thickness, at least about three times the pipe wall thickness, or at least about four times the pipe wall thickness, or any diameter there between. In an embodiment, there are at least 2 corrosion indicators 102 around one vent 122, at least 4 corrosion indicators 102 around one vent 122, at least 6 corrosion indicators 102 around one vent 122, at least 8 corrosion indicators 102 around one vent 122, at least 10 corrosion indicators 102 around one vent 122, or any number there between.

The minimum distance between the corrosion indicators 102 is preferably determined to minimize or altogether eliminate cross permeation between corrosion indicators 102 resulting from lateral corrosion of the pipe 104 between the indicators.

Each indicator 102 may have a cavity 108 of a different depth, so that as corrosion progresses, the indicators 102 will actuate successively, providing the user with time-phased information about the progression of the corrosion at that location. The difference between the cavity depths can be selected depending on level of detail that the user desires about the rate of corrosion. For example, if the pipe 104 conveys a hazardous material (such as phosgene, hydrofluoric acid, chloroacetic acid, or oleum), the user can select relatively deep, similar cavity depths so that an alert is generated soon after corrosion begins, and further alerts are generated quickly as corrosion proceeds.

In an embodiment, the pipe 104 is suitable for conveying a hydrogen halide, halogen, phosgene or other corrosive chemical. In an embodiment, the pipe 104 conveys a liquid. In another embodiment, the pipe 104 conveys a gas. In an embodiment, the temperature of the conveyed fluid is up to about 450° F.

In an embodiment, the sensor 116 is capable of conveying a signal with a single wire. In another embodiment, the sensor 116 is capable of conveying a signal without any wire connections, for example, by an electromagnetic signal. In an embodiment, the sensor 114 is a radio-frequency identification (RFID) tag.

While the present invention has been described with respect to various embodiments, it is to be understood that the invention is not limited to the disclosed embodiments. To the contrary, the invention is intended to cover various modifications and equivalent arrangements included within the spirit and scope of the appended claims.

What is claimed is:

1. A pipe corrosion indicating system, comprising:
a metal pipe having an inner surface and an outer surface and having a thickness extending between the inner and the outer surfaces;
a non-metallic liner in the met pipe, contacting the inner surface of the metal pipe;
at least one corrosion indicator, wherein the at least one corrosion indicator comprises:
a cavity formed in the outer surface of the metal pipe; and
a sensor in the cavity; and
a vent that extends through the thickness of the metal pipe, wherein the at least one corrosion indicator is located within a distance of six inches from the vent.

2. The system according to claim 1, wherein the sensor is configured to detect water, an acid, a base and/or a halogen.

3. The system according to claim 1, wherein the at least one corrosion indicator is located around the vent, and each of the at least one corrosion indicators being in a cavity of a different respective depth, whereby corrosion of a portion of the thickness of the metal pipe beginning from the inner surface allows permeate chemical species into the cavity of each of the at least one corrosion indicators in succession as the corrosion progresses.

4. The system according to claim 1, wherein the non-metallic liner comprises a polymeric material.

5. The system according to claim 4, wherein the polymeric material is a polytetrafluoroethylene.

6. The system according to claim 1, further comprising a sealing device, which seals an inside of the cavity containing the sensor from ambient atmosphere.

7. The system according to claim 6, wherein the sealing device comprises a metallic lid and a non-metallic grommet.

8. The system according to claim 1, wherein the cavity extends from the outer surface of the metal pipe a fraction X of the thickness of the metal pipe, whereby the cavity has a deepest portion located a distance from the inner surface equal to (1−X) times the thickness of the metal pipe, and wherein corrosion of a portion of the thickness of the metal pipe equal to (1−X) of the thickness, beginning from the inner surface, allows permeate chemical species into the cavity and into contact with the sensor.

9. The system according to claim 8, wherein X is from about 0.95 to about 0.05.

10. The system according to claim 1, wherein first and second electrical conductors each having a first end in the cavity and an exterior second end for connection to a voltage source are connected to the sensor.

11. The system according to claim 10, further comprising the voltage source connected to the exterior second ends of the first and second electrical conductors continuously.

12. The system according to claim 10, further comprising the voltage source configured to be connected to the exterior second ends of the first and second electrical conductors at intervals of time.

13. The system according to claim 10, wherein the sensor comprises a member comprising an electrically insulative material and disposed in the cavity, the first ends of the first and second electrical conductors extending into the electrically insulative material and being spaced from each other in the electrically insulative material.

14. The system according to claim 13, wherein the electrically insulative material is capable of absorbing fluid.

15. The system according to claim 14, wherein the electrically insulative material is porous.

16. The system according to claim 15, wherein the electrically insulative material is a mineral, ceramic, clay and/or polymeric material.

17. The system according to claim 16, wherein the first and second electrical conductors become electrically connected when the electrically insulative material absorbs a predetermined amount of the fluid.

18. A pipe corrosion indicating system, comprising:
a metal pipe having an inner surface and an outer surface and having a thickness extending between the inner and the outer surfaces;
a non-metallic liner in the met pipe, contacting the inner surface of the metal pipe;
a corrosion indicator, wherein the corrosion indicator comprises:
a cavity formed in the outer surface of the metal pipe;
first and second electrical conductors each having a first end in the cavity and an exterior second end for connection to a voltage source; and
a porous member comprising an electrically insulative material and disposed in the cavity, the first ends of the first and second electrical conductors extending into the porous member and being spaced from each other in the porous member; and
a vent that extends through the thickness of the metal pipe, wherein the corrosion indicator is located within a distance of six inches from the vent.

19. A corrosion indicator suitable for use in a metal pipe, the metal pipe including an inner surface and an outer surface and a thickness extending between the inner and the outer surfaces, a vent that extends through the thickness of the metal pipe, and a non-metallic liner in the metal pipe, contacting the inner surface, the corrosion indicator comprising:
first and second electrical conductors each having a first end and each having an exterior second end for connection to a voltage source;
a member comprising an electrically insulative material disposed in a cavity in the thickness of the metal pipe, the first ends of the first and second electrical conductors extending into the electrically insulative material and being spaced from each other in the electrically insulative material; and
wherein the corrosion indicator is located within a distance of six inches from the vent.

* * * * *